(12) United States Patent
Takahashi et al.

(10) Patent No.: US 11,601,082 B2
(45) Date of Patent: Mar. 7, 2023

(54) ROTARY MACHINE DRIVING SYSTEM AND VEHICLE

(71) Applicant: HITACHI, LTD., Tokyo (JP)

(72) Inventors: Akeshi Takahashi, Tokyo (JP); Shinji Sugimoto, Tokyo (JP); Kazuo Nishihama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 39 days.

(21) Appl. No.: 17/280,422

(22) PCT Filed: Jun. 21, 2019

(86) PCT No.: PCT/JP2019/024840
§ 371 (c)(1),
(2) Date: Mar. 26, 2021

(87) PCT Pub. No.: WO2020/066170
PCT Pub. Date: Apr. 2, 2020

(65) Prior Publication Data
US 2022/0006411 A1 Jan. 6, 2022

(30) Foreign Application Priority Data
Sep. 28, 2018 (JP) .............................. JP2018-185826

(51) Int. Cl.
*H02P 5/00* (2016.01)
*H02P 25/18* (2006.01)
(Continued)

(52) U.S. Cl.
CPC ............ *H02P 25/184* (2013.01); *H02P 25/22* (2013.01); *H02P 25/24* (2013.01); *H02P 27/06* (2013.01);
(Continued)

(58) Field of Classification Search
CPC ............... H02P 25/184; H02P 2101/45; H02P 2103/20; H02P 25/22; H02P 25/24; H02P 27/06
See application file for complete search history.

(56) References Cited

FOREIGN PATENT DOCUMENTS

JP   2002-291288 A   10/2002
JP   2012-067722 A   4/2012
(Continued)

OTHER PUBLICATIONS

International Search Report, PCT/JP2019/024840, dated Oct. 1, 2019 (1 pg.).

*Primary Examiner* — Karen Masih
(74) *Attorney, Agent, or Firm* — Volpe Koenig

(57) ABSTRACT

A rotary machine driving system includes: a rotary machine including a plurality of coils; an inverter device configured to operate the rotary machine at a variable speed, including a control device for controlling power conversion by an inverter circuit, and a coil switching device for switching a connection of the coils according to the control device. The control device commands the coil switching device to switch the connection of the coils when rotation of the rotary machine transitions between a low-speed rotation range and a high-speed rotation range due to acceleration and deceleration. A starting end and a terminal end of at least one set of coils per phase of the rotary machine are drawn out in a freely connectable state. The coil switching device includes at least one movable portion driven by one actuator.

9 Claims, 12 Drawing Sheets

(51) Int. Cl.
  *H02P 25/22*     (2006.01)
  *H02P 25/24*     (2006.01)
  *H02P 27/06*     (2006.01)
  H02P 101/45    (2016.01)
  H02P 103/20    (2016.01)
(52) U.S. Cl.
  CPC ...... *H02P 2101/45* (2015.01); *H02P 2103/20* (2015.01)

(56) References Cited

FOREIGN PATENT DOCUMENTS

| | | | |
|---|---|---|---|
| JP | 2012-110169 A | 6/2012 | |
| JP | 2017-070112 A | 4/2017 | |
| JP | 2020058112 A * | 4/2020 | ............ H02P 25/184 |
| WO | WO-2021049249 A1 * | 3/2021 | |

\* cited by examiner

[FIG. 1]
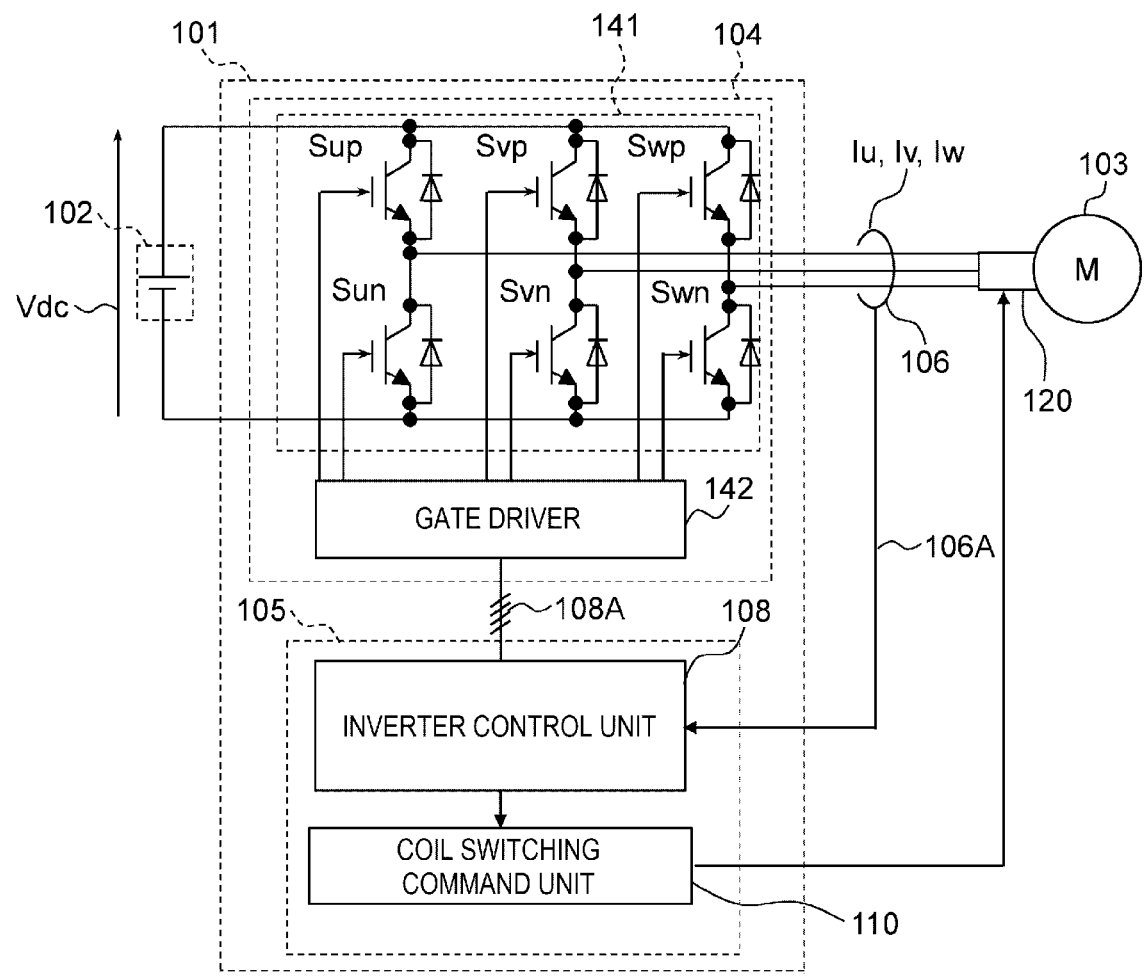

[FIG. 2]
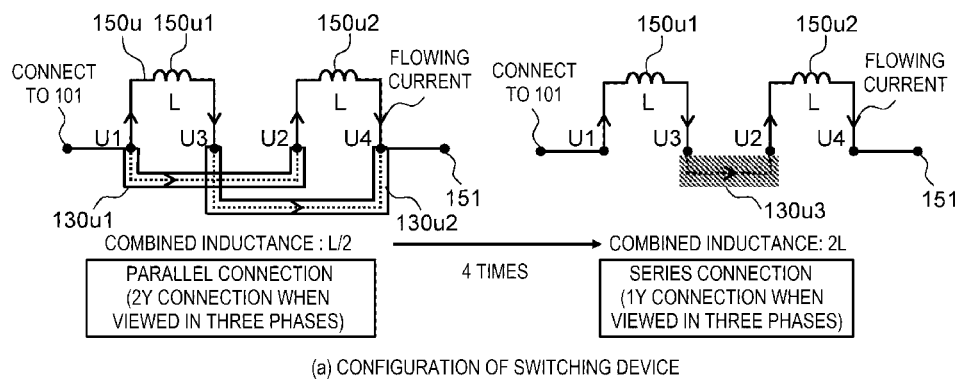
(a) CONFIGURATION OF SWITCHING DEVICE
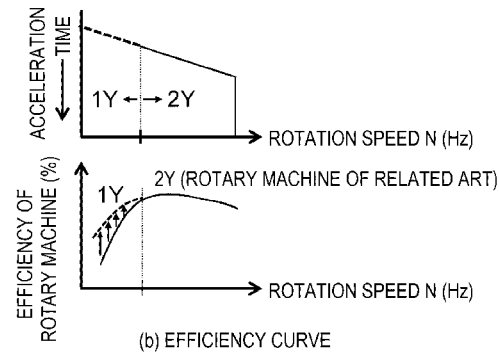
(b) EFFICIENCY CURVE

[FIG. 3]
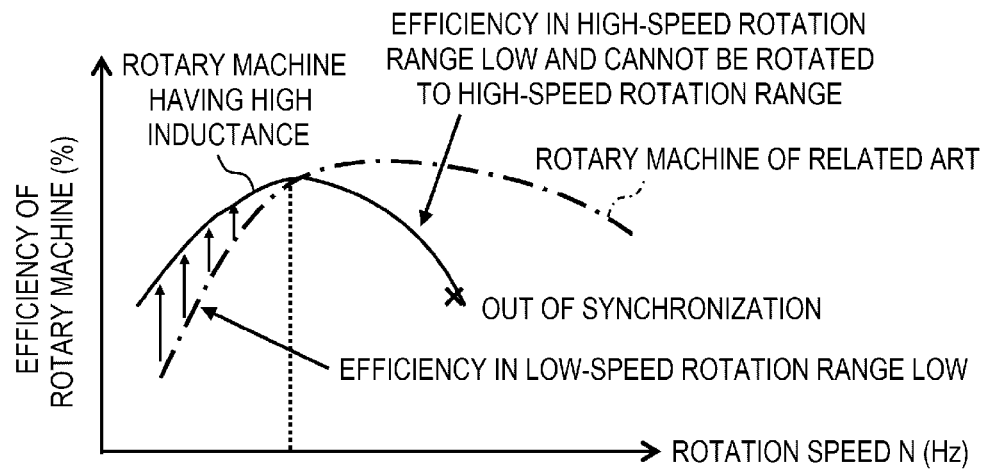
(a)
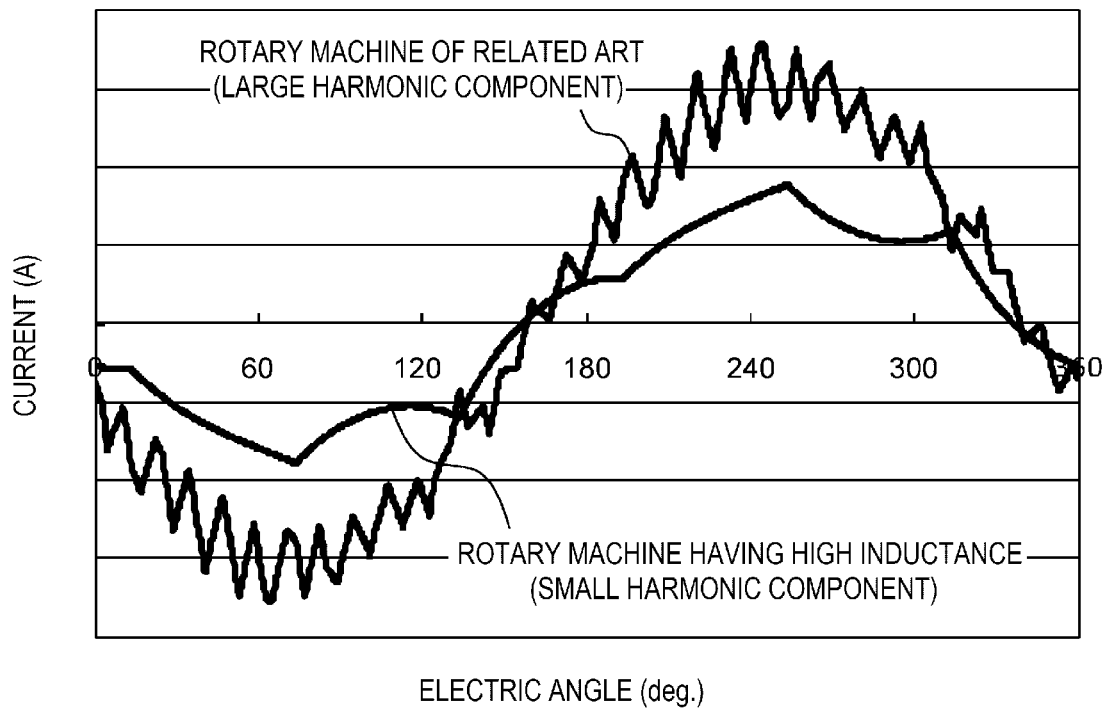
(b)

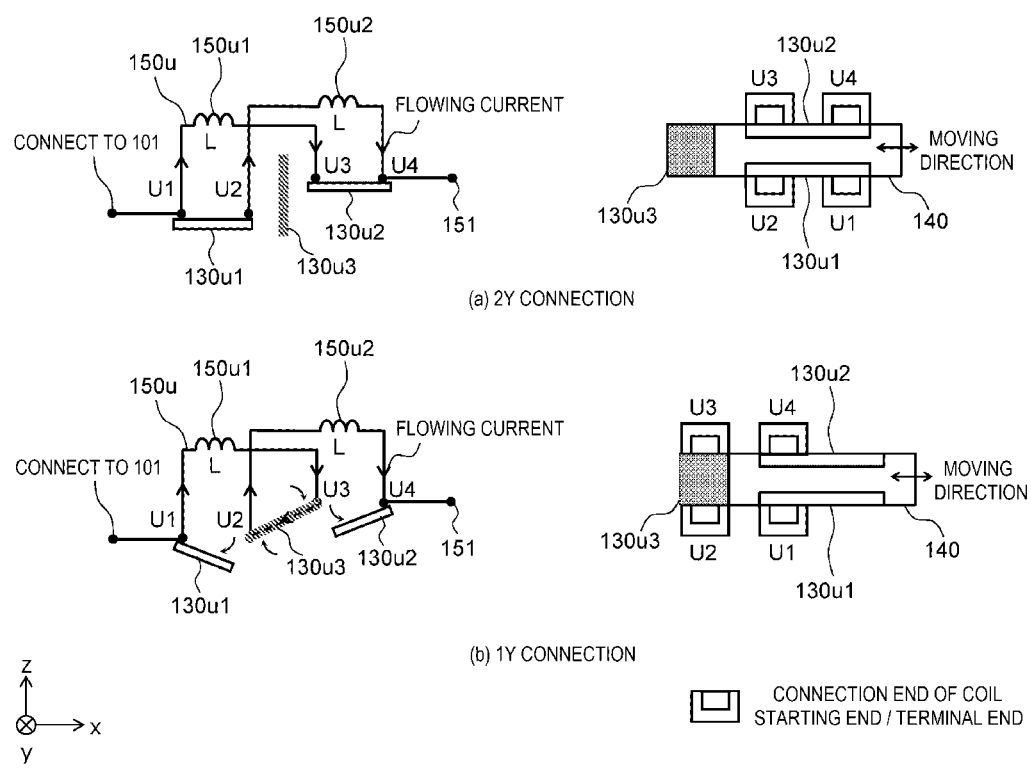
[FIG. 4]

[FIG. 5]
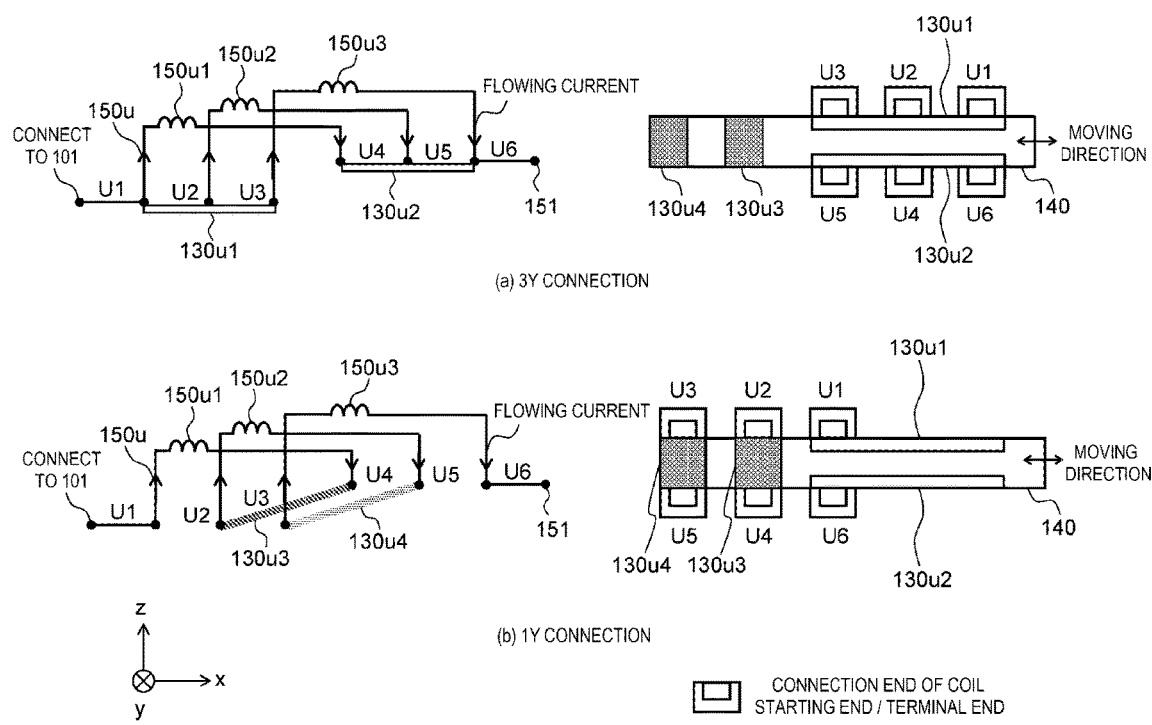

[FIG. 6]
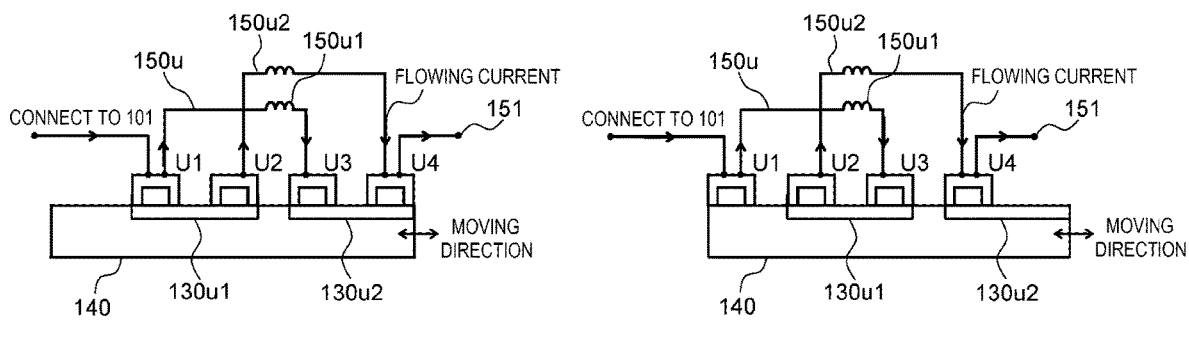
(a) 2Y CONNECTION
(b) 1Y CONNECTION
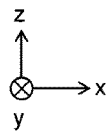
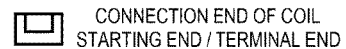 CONNECTION END OF COIL STARTING END / TERMINAL END

[FIG. 7]
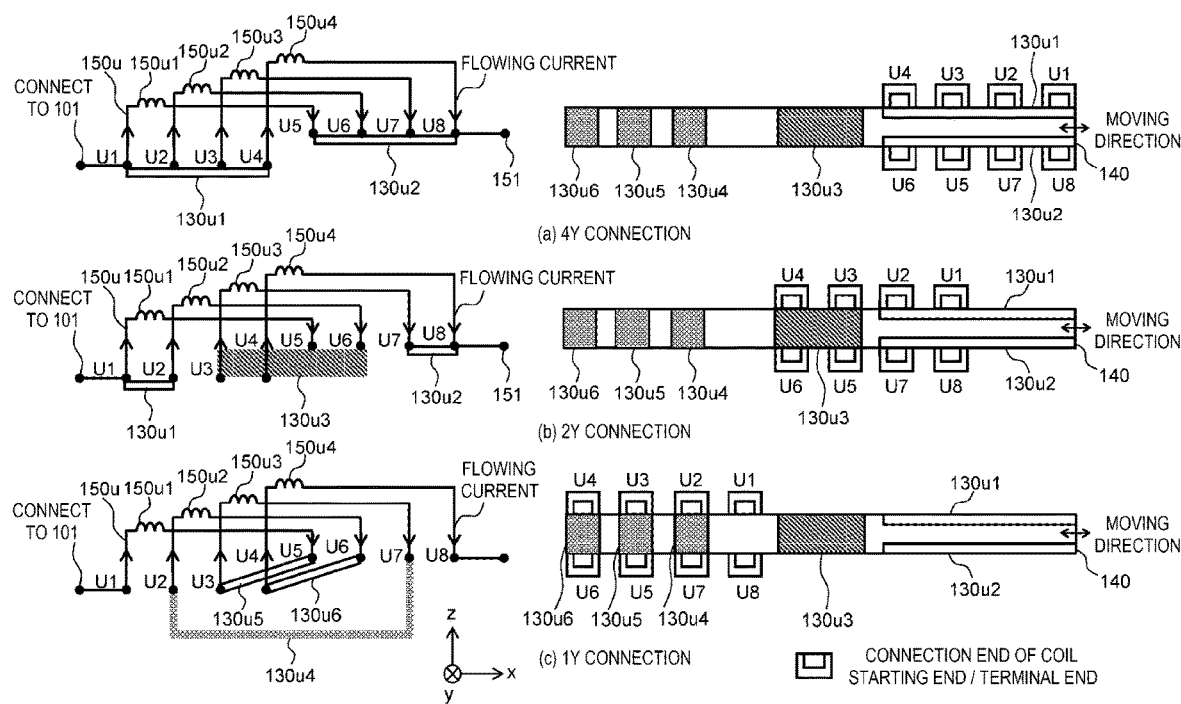

[FIG. 8A]
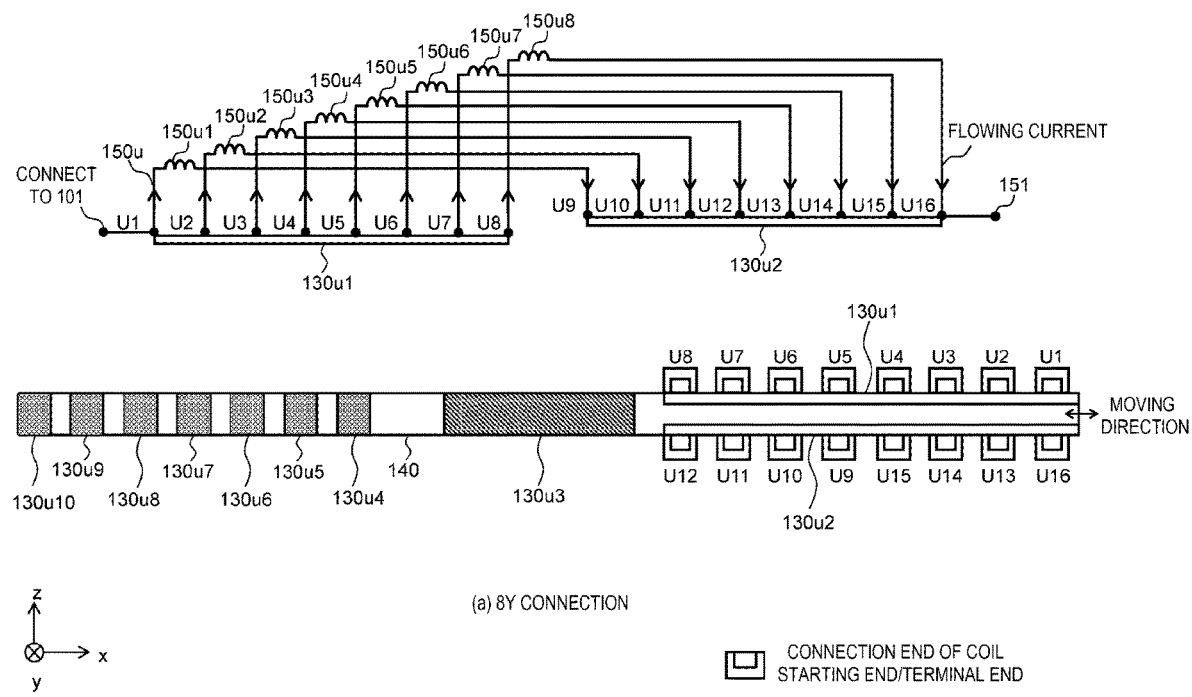
(a) 8Y CONNECTION

[FIG. 8B]
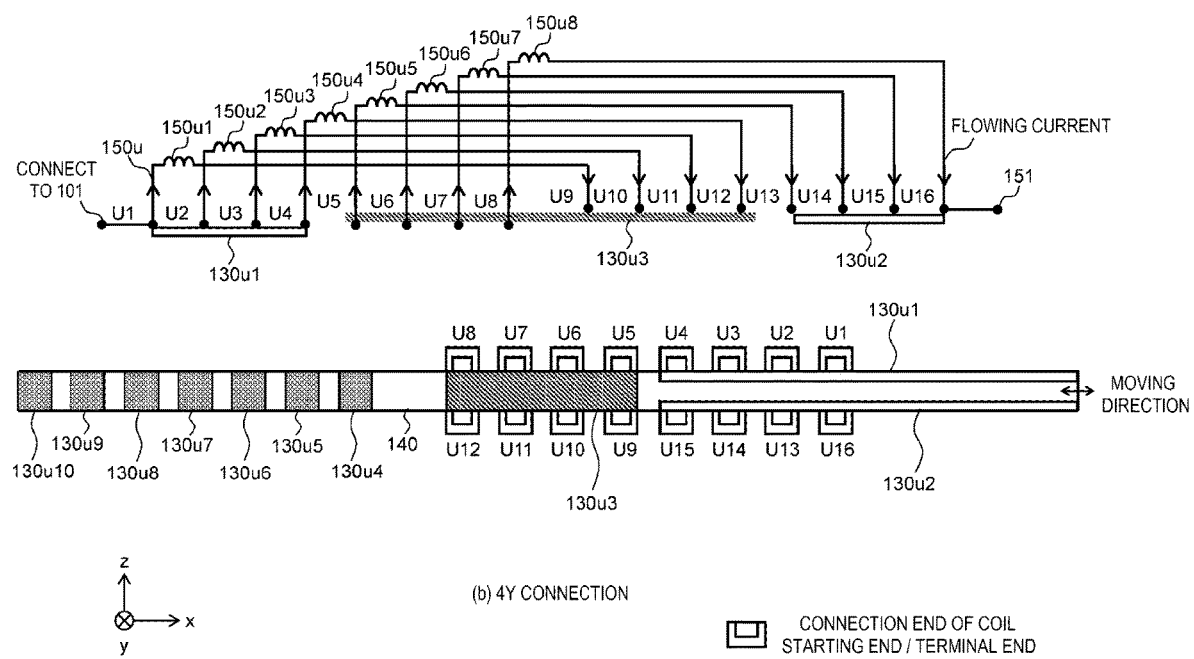
(b) 4Y CONNECTION

[FIG. 8C]
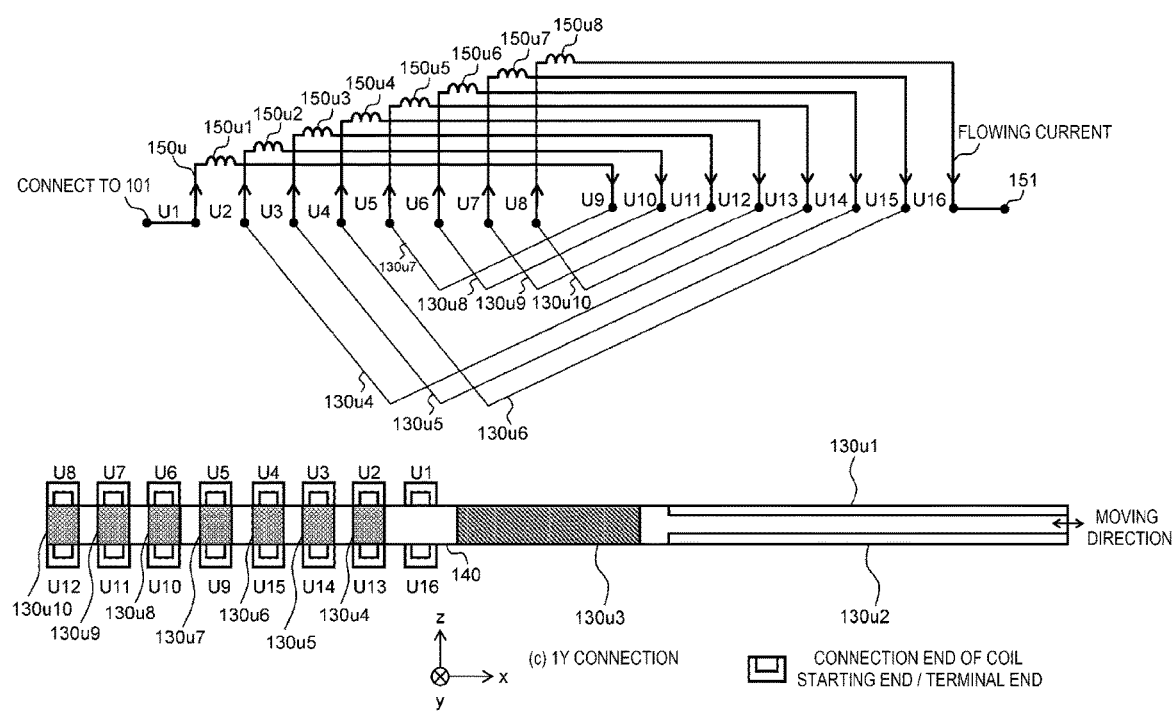

[FIG. 9]
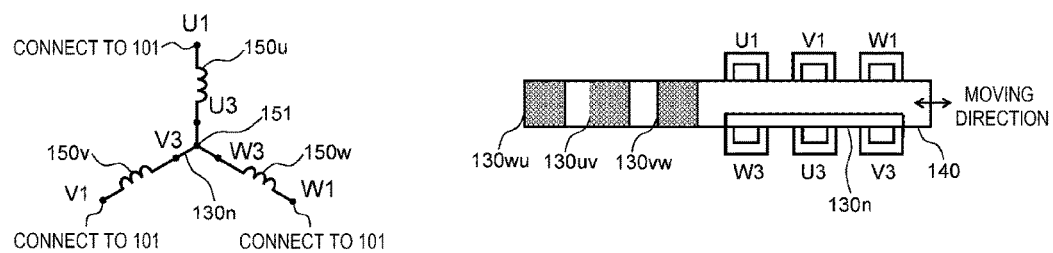
(a) Y CONNECTION
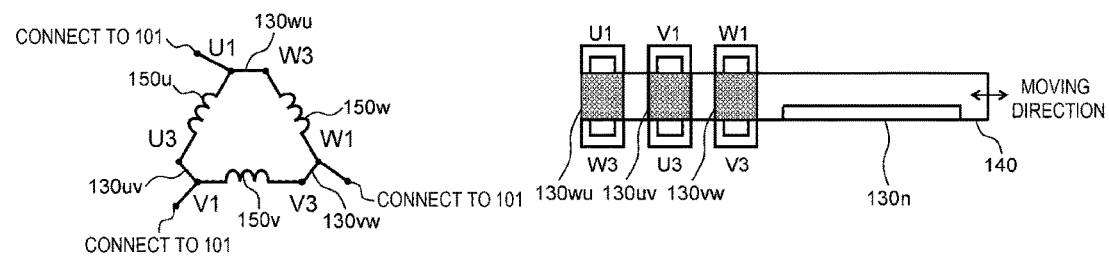
(b) Δ CONNECTION
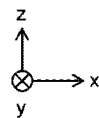

[FIG. 10]
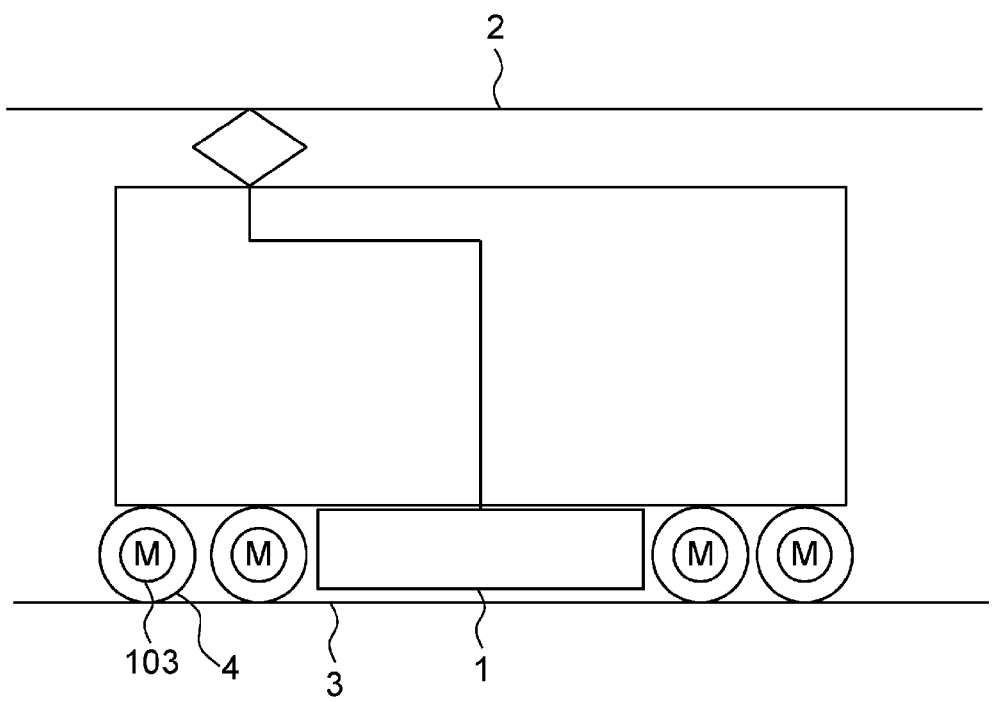

ROTARY MACHINE DRIVING SYSTEM AND VEHICLE

TECHNICAL FIELD

The present invention relates to a rotary machine driving system and a vehicle using a coil switching device.

BACKGROUND ART

Efficiency of a rotary machine operated at a variable speed by an inverter device is generally represented by an efficiency curve obtained by changing a rotation speed under a constant load condition, and the efficiency peaks in a part of a rotation region among a required rotation range. In order to realize energy saving of equipment, it is important to improve the efficiency curve in a wide rotation range and reduce a power loss of the rotary machine.

It is known that efficiency of a rotary machine is low in a low-speed rotation range, but a current value thereof can be reduced and a harmonic component can be reduced by increasing an inductance of the rotary machine at a design stage. As a result, the efficiency in the low-speed rotation range can be improved, but on the other hand, there is a problem that efficiency in a high-speed rotation range is lowered.

Further, it is known that the rotary machine can be driven in a wider rotation range as long as the rotary machine can have a high inductance in the low-speed rotation range and a low inductance in the high-speed rotation range, but when the rotary machine has the high inductance in the high-speed rotation range, there is a problem that the rotation range of the rotary machine is limited.

To solve such a problem, there is a technique of switching a connection of a stator coil between a low-speed rotation range and a high-speed rotation range as in PTL 1. PTL 1 discloses a switching device that moves contact points of coil ends by using a dedicated drive device in order to freely switch a connection state.

CITATION LIST

Patent Literature

PTL 1: JP-A-2017-070112

SUMMARY OF INVENTION

Technical Problem

The rotary machines mounted in automobiles and railway vehicles have achieved miniaturization and weight reduction by causing a large current to flow, so as to increase output density. When coil switching is applied for such use, addition of a coil switching device causes increase in a size of an entire rotary machine, and in addition, a configuration of the coil switching device is complicated in the related art, resulting in a significant increase in cost. Accordingly, the miniaturization and cost reduction of the coil switching device becomes a problem.

In PTL 1, a plurality of movable bodies having different short-circuit wiring patterns are prepared for the contact points of the coil ends, and the connection state is switched by moving the movable bodies. However, in the disclosed configuration, short-circuit wirings are complicatedly intersected with each other, and are difficult to manufacture. In addition, in order to cope with the large current, it is necessary to configure the short-circuit wirings with a bus bar or the like having a large conductor area, but there is a problem that complicated bending processing and assembling of the bus bar causes a significant increase in cost. In addition, there is a method of configuring a switching device by using a relay, but as the current increases, a size of a relay device increases and a cost increases, and thus the above problem cannot be solved.

An object of the invention is to miniaturize a coil switching device in a rotary machine driving system by using a short-circuit conductor having a simple configuration.

Solution to Problem

In order to achieve the above object, in the invention, a rotary machine driving system includes: a rotary machine including a plurality of coils; an inverter device configured to operate the rotary machine at a variable speed, the inverter device including an inverter circuit configured to convert DC power from a DC power supply into AC power and a control device configured to control power conversion by the inverter circuit, and; and a coil switching device configured to switch a connection of the plurality of coils according to a command from the control device. The control device commands the coil switching device to switch the connection of the coils when rotation of the rotary machine transitions between a low-speed rotation range and a high-speed rotation range due to acceleration and deceleration. A starting end and a terminal end of at least one set of coils per phase of the rotary machine are drawn out in a freely connectable state. The coil switching device includes at least one movable portion driven by one actuator. The movable portion includes a first short-circuit portion configured to short-circuit at least two starting ends, a second short-circuit portion configured to short-circuit at least two terminal ends, and a third short-circuit portion configured to short-circuit at least one of the starting ends and at least one of the terminal ends. Each of the first short-circuit portion, the second short-circuit portion, and the third short-circuit portion is formed of a rectangular parallelepiped conductor, a cylindrical column conductor, or a cylindrical tube conductor.

Advantageous Effect

According to the invention, it is possible to miniaturize a coil switching device in a rotary machine driving system and reduce a cost by using a short-circuit conductor having a simple configuration.

BRIEF DESCRIPTION OF DRAWINGS

FIG. 1 is a block diagram showing an overall configuration of a rotary machine driving system according to a first embodiment of the invention.

FIG. 2 is an explanatory diagram of a coil switching device according to the first embodiment of the invention.

FIG. 3 is a diagram showing efficiency curves and current waveforms of rotary machines capable of performing a variable speed operation by an inverter device.

FIG. 4 is an explanatory diagram of a 1Y/2Y switching device according to the first embodiment of the invention.

FIG. 5 is an explanatory diagram of a 1Y/3Y switching device according to a modification of the first embodiment of the invention.

FIG. 6 is an explanatory diagram of a 1Y/2Y switching device according to a second embodiment of the invention.

FIG. 7 is an explanatory diagram of a 1Y/2Y/4Y switching device according to a third embodiment of the invention.

FIG. 8A is an explanatory diagram of a 1Y/4Y/8Y switching device according to a modification of the third embodiment of the invention.

FIG. 8B is an explanatory diagram of the 1Y/4Y/8Y switching device according to the modification of the third embodiment of the invention.

FIG. 8C is an explanatory diagram of the 1Y/4Y/8Y switching device according to the modification of the third embodiment of the invention.

FIG. 9 is an explanatory diagram of a Y/Δ switching device according to a fourth embodiment of the invention.

FIG. 10 is a configuration diagram of a rotary machine driving system used in a railway vehicle according to a fifth embodiment of the invention.

DESCRIPTION OF EMBODIMENTS

Hereinafter, an embodiment of the invention will be described with reference to the drawings. In the following description, the same components are denoted by the same reference numerals. Names and functions thereof are the same, and redundant description will be omitted. In addition, in the following description, the number of parallel connections is several, but effect of the invention is not limited thereto, and the invention is also applicable to a configuration for switching a Y connection having a number of parallel connections different from the above, a configuration for switching the number of parallel connections of a Δ connection, or a configuration for switching a Y connection and a Δ connection.

The rotary machine may be an induction machine, a permanent magnet synchronous machine, a coil synchronous machine, or a synchronous reluctance rotary machine. A method for coiling a stator may be concentrated coiling or distributed coiling. In addition, the number of phases of a stator coil is not limited to a configuration of the embodiment.

In addition, an insulated gate bipolar transistor (IGBT) is a target of a semiconductor switching element of an inverter device, but the effect of the invention is not limited thereto, and a metal oxide semiconductor field effect transistor (MOSFET) or another power semiconductor element may be used.

In addition, vector control that does not use a speed detector or a voltage detector is used as a control method of the rotary machine, but the invention is also applicable to a control method that uses a speed detector or a voltage detector.

First Embodiment

Hereinafter, a first embodiment of the invention will be described with reference to FIGS. 1 to 5. FIG. 1 is a block diagram showing an overall configuration of a rotary machine driving system according to the first embodiment of the invention. FIG. 2 is an explanatory diagram of a coil switching device according to the first embodiment of the invention. FIG. 3 is a diagram showing efficiency curves and current waveforms of rotary machines capable of performing a variable speed operation by an inverter device. FIG. 4 is an explanatory diagram of a 1Y/2Y switching device according to the first embodiment of the invention. FIG. 5 is an explanatory diagram of a 1Y/3Y switching device according to a modification of the first embodiment of the invention.

The overall configuration of the rotary machine driving system according to the present embodiment will be described with reference to FIG. 1. In FIG. 1, an inverter device 101 includes an inverter circuit 104 that converts DC power output by a DC power supply 102 into AC power and outputs the AC power to a rotary machine 103, a phase current detection circuit 106 that detects a current flowing through the rotary machine 103 connected to the inverter circuit 104, and a control device 105 that performs inverter control (power conversion control) on the inverter circuit 104 by using an applied voltage command pulse signal 108A based on phase current information 106A detected by the phase current detection circuit 106 to operate the rotary machine 103 at a variable speed.

The phase current detection circuit 106 includes a Hall effect current transformer (CT) or the like, and detects three-phase current waveforms Iu, Iv, Iw of a U-phase, a V-phase, and a W-phase. However, the phase current detection circuit 106 is not always necessary to detect all the currents of the three phases, and may also have a configuration in which any two phases are detected and the other phase is obtained by calculation based on an assumption that the three-phase currents are in an equilibrium state. The inverter circuit 104 includes an inverter main circuit 141 including a plurality of semiconductor switching elements such as IGBTs and diodes (freewheeling diodes), and a gate driver 142 that generates a gate signal to the IGBT of the inverter main circuit 141 based on the applied voltage command pulse signal 108A from an inverter control unit 108.

The rotary machine 103 is configured with, for example, an induction machine including a plurality of coils, in which a starting end and a terminal end of each of some of the coils are drawn out so as to switch a connection of the coils, and are stored in a coil switching device 120. The coil switching device 120 includes a circuit configuration capable of switching the connection of the coils of the rotary machine 103, and switches the connection of the coils based on a signal output from a coil switching command unit 110 when rotation of the rotary machine 103 transitions between a low-speed rotation range and a high-speed rotation range.

The control device 105 includes the inverter control unit 108 that generates the applied voltage command pulse signal 108A by using the phase current information 106A detected by the phase current detection circuit 106, and the coil switching command unit 110 that provides a connection switching signal to the coil switching device 120.

The rotary machine driving system includes at least the inverter device 101, the rotary machine 103, and the coil switching device 120.

Next, a configuration of the switching device will be described with reference to FIG. 2, and the problem and the solution of the related art, and a principle that can realize miniaturization of a coil switching device, which is the object of the invention, will be described with reference to FIGS. 3 and 4.

FIG. 2(a) is a diagram schematically showing a configuration in which, with respect to a U-phase coil 150u of a stator of the rotary machine 103, starting ends (terminals) U1, U2 and terminal ends (terminals) U3, U4 of two U-phase coils 150u1, 150u2 are drawn out to switch between series/parallel connections. Since the same is applied to the V-phase and the W-phase, description thereof is omitted. A configuration in which the starting end U1, the starting end U2 and the terminal end U3, the terminal end U4 of the U-phase coil 150u in FIG. 2(a) are respectively connected in parallel by short-circuit wires 130u1, 130u2, a V-phase coil and a W-phase coil are also connected in parallel, and neutral points 151 of the three phases are connected in a Y-shape is referred to as a 2Y connection. On the other hand, a configuration in which the terminal end U3 of the U-phase coil 150u1 and the starting end U2 of the U-phase coil 150u2 in FIG. 2A are connected in series by a short-circuit wire 130u3, the V-phase coil and the W-phase coil are similarly connected in series, and the neutral points 151 of the three phases are connected in the Y-shape is referred to as a 1Y connection.

As shown in FIG. 2(a), while a combined inductance of a parallel connection (2Y connection when viewed in three phases) is L/2, a combined inductance of a series connection (1Y connection when viewed in three phases) is 2L, and the inductance becomes four times large. Therefore, by the series connection, a harmonic component of a current supplied from the inverter device 101 to the rotary machine 103 is significantly reduced.

In a rotary machine of the related art, in order to expand a rotation range, an inductance is designed to be small, so that a harmonic component of a current becomes large, and as shown in FIG. 3A, there is a problem that efficiency becomes low particularly in a low-speed rotation range with respect to a rotation speed N. One of reasons is that the rotary machine of the related art is designed to have a small inductance in order to expand the rotation range. In the rotary machine of the related art having a small inductance, as shown in the graph of FIG. 3 (b) in which an electric angle is set as a horizontal axis and a current is set as a vertical axis, a harmonic component corresponding to a switching frequency of the inverter device overlaps with a substantially sinusoidal current waveform supplied to the rotary machine. For this reason, a harmonic component of an iron loss generated in a core of the rotary machine, an AC copper loss generated due to skin effect and proximity effect of a stator coil, and the like become large, and as a result, the efficiency of the rotary machine is lowered.

On the other hand, it is known that, by increasing the inductance of the rotary machine at a design stage, a current value thereof can be reduced and the harmonic component can be reduced, as shown in the graph of FIG. 3(b). As a result, as shown in FIG. 3(a), the efficiency in the low-speed rotation range can be improved, but on the other hand, there is a problem that as efficiency in a high-speed rotation range is lowered, a rotor cannot be driven to the high-speed rotation range and is out of synchronization.

In response to such a problem, by using the coil switching device 120 to achieve the series connection (1Y connection when viewed in the three phases) in the low-speed rotation range and to achieve the parallel connection (2Y connection when viewed in the three phases) in the high-speed rotation range, an efficiency curve in a wide rotation range can be improved and a power loss of the rotary machine 103 can be reduced while enabling driving in the required wide rotation range. In addition, in the low-speed rotation range, the inductance of the rotary machine 103 is increased by the series connection, so that a value of the current supplied from the inverter device 101 can be reduced, and a power loss of the inverter device 101 can be significantly reduced.

However, in the related art, a plurality of movable bodies having different short-circuit wiring patterns are prepared for contact points of coil ends, and a connection state is switched by moving the movable bodies. In this configuration, as shown in FIG. 2(a), the short-circuit wirings are complicatedly intersected with each other, and thus is difficult to manufacture. In addition, in order to cope with a large current, it is necessary to configure the short-circuit wiring with a bus bar or the like having a large conductor area, but there is a problem that complicated bending processing and assembling work of the bus bar causes a significant increase in cost.

These problems can be solved by adopting a configuration of switching contact points as shown in FIG. 4. A specific solution and a principle capable of realizing miniaturization and cost reduction of a coil switching device, which is an object of the invention, will be described in detail below.

FIG. 4 is an explanatory diagram of a 1Y/2Y switching device according to the first embodiment of the invention. In the following, as shown in FIG. 4, the configuration of the switching contact points according to the first embodiment of the invention will be described using an XYZ coordinate system in which a horizontal direction is defined as an X axis, a depth direction of a paper surface is defined as a Y axis, and a vertical direction is defined as an Z axis.

FIG. 4 is different from the configuration of the related art (FIG. 2) in that each of the short-circuit portions 130u1, 130u2, 130u3 is formed of a simple rectangular parallelepiped conductor. A method for implementing this configuration will be described below with reference to right side views of FIG. 4(a), 4(b). In the right side views of FIG. 4(a), 4(b), the coil 150u is omitted in order to cope with a relationship between the ends U1 to U4, a movable portion 140, and the short-circuit portion 130. In the present embodiment, the starting ends U1, U2 and the terminal ends U3, U4 of each of two sets of coils per phase are drawn out in a freely connectable state. The coil switching device 120 includes at least one movable portion 140 driven by one actuator. The movable portion 140 includes a first short-circuit portion 130u1 that short-circuits the starting ends U1, U2, a second short-circuit portion 130u2 that short-circuits the terminal ends U3, U4, and a third short-circuit portion 130u3 that short-circuits the starting end U2 and the terminal end U3. A distance between the starting end U2 and the terminal end U4 is set so as to be larger than a distance between the starting end U2 and the starting end U1 and a distance between the starting end U2 and the terminal end U3. The movable portion 140 is formed of a substrate or a block made of an insulating material such as resin.

Each of the short-circuit portions 130u1, 130u2, 130u3 is formed of a rectangular parallelepiped conductor, a cylindrical column conductor, or a cylindrical tube conductor. The short-circuit portions 130u1, 130u2, 130u3 are mechanically fixed to the movable unit 140 or fixed to the movable portion 140 by an adhesive, but fixing methods are not limited thereto. Contact surfaces of the starting ends U1, U2 and the terminal ends U3, U4 in contact with the short-circuit portions 130u1, 130u2, 130u3 have shapes corresponding to outer peripheral surfaces of the short-circuit portions 130u1, 130u2, 130u3 so as to ensure a sufficient contact area, but the contact surfaces are not limited to these shapes as long as the sufficient contact area is ensured.

With such a configuration, the movable portion 140 can be made extremely compact even in the case of coping with a large current, and thus the coil switching device can be miniaturized. In addition, the movable portion 140 can be formed only by embedding the simple rectangular parallelepiped conductor, and thus can be manufactured at extremely low cost.

The movable portion 140 may be made of any material as long as insulation of the plurality of short-circuit portions 130 can be ensured. The short-circuit portion 130 and the movable portion 140 may be integrally formed by using a printed circuit board. The starting ends U1, U2 and the terminal ends U3, U4 may be held in any manner as long as insulation can be ensured therebetween, and in the point of miniaturizing the coil switching device 120, at least two ends are preferably mechanically connected by an insulator and fixed to each other, but are not limited to being mechanically fixed.

Further, in FIG. 4, with respect to the set of the short-circuit portions 130$u$1, 130$u$2, the short-circuit portion 130$u$3 is disposed in an X-axis direction, and the movable portion 140 is moved in the X-axis direction, but the effect of the invention is not limited to this arrangement. For example, the same effect can be obtained by a configuration in which the short-circuit portion 130$u$3 is disposed in a Y-axis direction and the movable portion 140 is moved in the Y-axis direction with respect to the set of the short-circuit portions 130$u$1, 130$u$2.

Further, in FIG. 4, a set of the terminal ends U3, U4 is disposed so as to face a set of the starting ends U1, U2 in a Z-axis direction, but the set of the starting ends U1, U2 may have exactly the same configuration as the set of the terminal ends U3, U4, and may be disposed in the Y-axis direction with respect to the set of the terminal ends U3, U4 so as to be disposed on the same XY plane.

As described above, the problem and the solution of the related art, and the principle that can realize the miniaturization of the coil switching device and cost reduction, which are the object of the invention, is described.

Modification of First Embodiment

Next, FIG. 5 is an explanatory diagram of a case in which the invention is expanded to a 1Y/3Y switching device. FIG. 5 is different from FIG. 4 in that a U-phase coil 150$u$ includes three coils 150$u$1, 150$u$2, 150$u$3, and starting ends (terminals) U1, U2, U3 and terminal ends (terminals) U4, U5, U6 of each of the coils are respectively drawn out in the freely connectable state. A movable portion 140 includes a first short-circuit portion 130$u$1 that short-circuits the starting ends U1, U2, U3, a second short-circuit portion 130$u$2 that short-circuits the terminal ends U4, U5, U6, a third short-circuit portion 130$u$3 that short-circuits the starting end U2 and the terminal end U4, and a fourth short-circuit portion 130$u$4 that short-circuits the starting end U3 and the terminal end U5. A distance between the starting end U3 and the terminal end U6 is set so as to be larger than a distance between the starting end U3 and the starting end U1 and a distance between the starting end U3 and the terminal end U4.

With such a configuration, the movable portion 140 can be made extremely compact even in the 1Y/3Y switching device, and thus the coil switching device can be miniaturized. In addition, the movable portion 140 can be formed only by embedding the simple rectangular parallelepiped conductor, and thus can be manufactured at extremely low cost.

A configuration in which the configuration described in the first embodiment is generalized to a 1Y/nY (n is an integer of 2 or more) switching device is as follows. That is, starting ends U1, U2, . . . , Un of each of n sets of coils per phase, and the terminal ends Un+1, Un+2, . . . , U2n of each of this n sets of coils are drawn out in the freely connectable state. A movable portion 140 includes a first short-circuit portion that short-circuits the starting ends U1, U2, . . . , Un, a second short-circuit portion that short-circuits the terminal ends Un+1, Un+2, . . . , U2n, and (m+1)th short-circuit portions (m is all integers of 2 or more and n or less) that short-circuit starting ends Um and terminal ends Un+m−1.

A distance between the starting end Un and the terminal end U2n is set so as to be larger than a distance between the starting end Un and the starting end U1 and a distance between the starting end Un and the terminal end Un+1.

By using the coil switching device 120 to achieve the series connection (1Y connection when viewed in the three phases) in the low-speed rotation range in which the rotation speed of the rotary machine 103 is less than a first predetermined value, and to achieve the parallel connection (nY connection when viewed in the three phases) in the high-speed rotation range in which the rotation speed of the rotary machine 103 is equal to or more than the first predetermined value, the same effects as those of the 1Y/2Y switching device and the 1Y/3Y switching device described above can be obtained.

Second Embodiment

Next, a second embodiment of the invention will be described with reference to FIG. 6. FIG. 6 is an explanatory diagram of a 1Y/2Y switching device according to the second embodiment of the invention.

A difference from FIG. 4 is that, in the movable portion 140, the short-circuit portion 130$u$1 also serves as a third short-circuit portion that short-circuits the starting end U2 and the terminal end U3. With such a configuration, since the third short-circuit portion 130$u$3 is unnecessary, a component cost can be reduced, and since the number of components is reduced, the assembling work can be simplified, and the manufacture can be performed at a further low cost.

The short-circuit portion 130$u$2 may also serve as the third short-circuit portion that short-circuits the starting end U2 and the terminal end U3.

Third Embodiment

A third embodiment of the invention will be described with reference to FIG. 7. FIG. 7 is an explanatory diagram of a 1Y/2Y/4Y switching device according to the third embodiment of the invention. The 1Y/2Y/4Y switching device in the third embodiment is expanded from the 1Y/2Y switching device in the first embodiment.

FIG. 7 is different from FIG. 4 in that a U-phase coil 150$u$ includes four coils 150$u$1, 150$u$2, 150$u$3, 150$u$4, and starting ends (terminals) U1, U2, U3, U4 and terminal ends (terminals) U5, U6, U7, U8 of each of the coils are drawn out in the freely connectable state, and that the connection state is switched between three stages of 1Y, 2Y, 4Y. A movable portion 140 includes a first short-circuit portion 130$u$1 that short-circuits the starting ends U1, U2, U3, U4, a second short-circuit portion 130$u$2 that short-circuits the terminal ends U5, U6, U7, U8, a third short-circuit portion 130$u$3 that short-circuits the starting ends U3, U4 and the terminal ends U5, U6, a fourth short-circuit portion 130$u$4 that short-circuits the starting end U2 and the terminal end U7, a fifth short-circuit portion 130$u$5 that short-circuits the starting end U3 and the terminal end U5, and a sixth short-circuit portion 130$u$6 that short-circuits the starting end U4 and the terminal end U6. A distance between the starting end U4 and the terminal end U8 is set so as to be larger than a distance between the starting end U4 and the starting end U1 and a distance between the starting end U4 and the terminal end U5.

With such a configuration, the movable portion 140 can be made extremely compact even in the case in which the number of parallel connections is large, and thus the coil switching device can be miniaturized. In addition, since the movable portion 140 can be formed only by embedding the simple rectangular parallelepiped conductor, the movable portion 140 can be manufactured at extremely low cost.

Modification of Third Embodiment

A modification of the third embodiment of the invention will be described with reference to FIGS. 8A to 8C. FIGS. 8A to 8C are explanatory diagrams of a 1Y/4Y/8Y switching device according to a modification of the third embodiment of the invention. FIGS. 8A to 8C show a case where a U-phase coil 150$u$ includes eight coils (150$u$1 to 150$u$8), and by providing a movable portion 140 and a short-circuit portion 130 in the same manner as in FIG. 7, the connection state is switched to three stages of 1Y, 4Y, 8Y.

The movable portion 140 includes a first short-circuit portion 130$u$1 that short-circuits starting ends U1, U2, U3, U4, U5, U6, U7, U8, a second short-circuit portion 130$u$2 that short-circuits terminal ends U9, U10, U11, U12, U13, U14, U15, U16, a third short-circuit portion 130$u$3 that short-circuits the starting ends U5, U6, U7, U8 and the terminal ends U9, U10, U11, U12, a fourth short-circuit portion 130$u$4 that short-circuits the starting end U2 and the terminal end U13, a fifth short-circuit portion 130$u$5 that short-circuits the starting end U3 and the terminal end U14, a sixth short-circuit portion 130$u$6 that short-circuits the starting end U4 and the terminal end U15, a seventh short-circuit portion 130$u$7 that short-circuits the starting end U5 and the terminal end U9, an eighth short-circuit portion 130$u$8 that short-circuits the starting end U6 and the terminal end U10, a ninth short-circuit portion 130$u$9 that short-circuits the starting end U7 and the terminal end U11, and a tenth short-circuit portion 130$u$10 that short-circuits the starting end U8 and the terminal end U12. A distance between the starting end U8 and the terminal end U16 is set to be larger than a distance between the starting end U8 and the starting end U1 and a distance between the starting end U8 and the terminal end U9.

As illustrated in FIG. 8B, in the present modification, when the third short-circuit portion 130$u$3 short-circuits the starting ends U5, U6, U7, U8 and the terminal ends U9, U10, U11, U12, the first short-circuit portion 130$u$1 short-circuits the starting ends U1, U2, U3, U4, and the second short-circuit portion 130$u$2 short-circuits the terminal ends U13, U14, U15, U16.

A configuration in which the configuration described in the third embodiment is generalized to a 1Y/kY/nY (n is an even number of 4 or more, and k=n/2) switching device is as follows. That is, starting ends U1, U2, ..., Un of each of n sets of coils per phase, and the terminal ends Un+1, Un+2, ..., U2n of each of this n sets of coils are drawn out in the freely connectable state. A movable portion 140 includes a first short-circuit portion that short-circuits the starting ends U1, U2, ..., Un, a second short-circuit portion that short-circuits the terminal ends Un+1, Un+2, ..., U2n, a third short-circuit portion that short-circuits starting ends Uk+1, Uk+2, ..., Un and terminal ends Un+1, Un+2, ..., U2n−k, (m+2)th short-circuit portions (m is all integers of 2 or more and k or less) that short-circuit starting ends Um and terminal ends Un+k+m−1, and (j+2)th short-circuit portions (j is all integers of k+1 or more and n or less) that short-circuit starting ends Uj and terminal ends Uk+j. A distance between the starting end Un and the terminal end U2n is set so as to be larger than a distance between the starting end Un and the starting end U1 and a distance between the starting end Un and the terminal end Un+1.

Here, by using the coil switching device 120, the series connection (1Y connection when viewed in the three phases) is achieved in the low-speed rotation range in which the rotation speed of the rotary machine 103 is less than a second predetermined value, a kY connection is achieved in an intermediate-speed rotation range in which the rotation speed of the rotary machine 103 is equal to or larger than the second predetermined value and less than the first predetermined value, and the parallel connection (nY connection when viewed in the three phases) is achieved in the high-speed rotation range in which the rotation speed of the rotary machine 103 is equal to or more than the first predetermined value. As described above, by finely switching the connection according to the rotation speed based on characteristics of the rotary machine 103, in the low-speed rotation range, it is possible to further improve the efficiency curve of the rotary machine 103, reduce the power loss, reduce the value of the current supplied from the inverter device 101 due to high inductance, and significantly reduce the power loss of the inverter device 101.

In the present generalized example, when the third short-circuit portion 130$u$3 short-circuits the starting ends Uk+1, Uk+2, ..., Un and the terminal ends Un+1, Un+2, ..., U2n−k, the first short-circuit portion 130$u$1 short-circuits the starting ends U1, U2, ..., Uk, and the second short-circuit portion 130$u$2 short-circuits the terminal ends U2n−k+1, U2n−k+2, ..., U2n.

Fourth Embodiment

A fourth embodiment of the invention will be described with reference to FIG. 9. FIG. 9 is an explanatory diagram of a Y/Δ switching device according to the fourth embodiment of the invention.

In a Δ connection, since a voltage applied to a coil 150$u$ of the U-phase, a coil 150$v$ of the V-phase, and a coil 150$w$ of the W-phase (phase voltage of each phase) is √(3) times as large as that in the Y connection, the rotary machine can rotate in a higher rotation speed region.

In FIG. 9, starting ends U1, V1, W1 of each of the coils of the respective phases and terminal ends U3, V3, W3 of each of the coils of the respective phases are drawn out in the freely connectable state. A movable portion 140 includes a first short-circuit portion that short-circuits the terminal ends U3, V3, W3, a second short-circuit portion that short-circuits the starting end U1 and the terminal end W3, a third short-circuit portion that short-circuits the starting end V1 and the terminal end U3, and a fourth short-circuit portion that short-circuits the starting end W1 and the terminal end V3. A distance between the starting end W1 and the terminal end W3 is set so as to be larger than a distance between the starting end W1 and the starting end U1 and a distance between the starting end W1 and the terminal end U3.

With such a configuration, for example, even in a case where the connection system is switched between different systems including the Y connection and the Δ connection, for example, the coils of the rotary machine are set to the Y connection at the time of starting, and the coils are switched to the Δ connection after a certain period of time is elapsed or after a predetermined rotation speed is reached, the coil switching device can be miniaturized since the movable portion 140 can be made extremely compact. In addition, the movable portion 140 can be formed only by embedding the simple rectangular parallelepiped conductor, and thus can be manufactured at extremely low cost.

Fifth Embodiment

A fifth embodiment of the invention will be described with reference to FIG. 10. FIG. 10 is a configuration diagram of a rotary machine driving system used in a railway vehicle according to the fifth embodiment of the invention.

A drive device of a railway vehicle 500 is supplied with power from an aerial wiring 2 via a power collecting device 5, and AC power is supplied to the rotary machine 103 via a power conversion device 1, thereby driving the rotary machine 103. The rotary machine 103 is coupled to an axle 4 of the railway vehicle 500, and travelling of the railway vehicle is controlled by the rotary machine 103. An electrical ground is connected via a rail 3. Here, a voltage of the aerial wiring 2 may be either DC voltage or AC voltage.

According to the present embodiment, the rotary machine driving system of the railway vehicle can be operated with high efficiency by mounting the rotary machine driving systems of the first to fourth embodiments on a railway vehicle system. In addition, the same effect can be obtained in a vehicle such as an automobile or a construction machine.

In the present embodiment, the rotary machine driving system provided in a railway, or a vehicle such as an automobile or a construction machine has a 1C1M configuration in which one inverter device 101 and one rotary machine 103 are driven in combination. Alternatively, a rotary machine driving system provided in a railway, or a vehicle such as an automobile or a construction machine has a 1CiM (i=2, 3, 4, . . . ) configuration in which one inverter device 101 and at least two rotary machines 103 are driven in combination. Therefore, in the present embodiment, a rotary machine driving system provided in a railway, or a vehicle such as an automobile or a construction machine may be configured with at least two groups of a combination of the inverter device 101 and the rotary machine 103.

The present invention is not limited to the embodiments described above, and other embodiments conceivable within the scope of the technical idea of the invention are also included within the scope of the invention as long as the embodiments do not depart from the scope of the invention. For example, the configurations and the processing exemplified in the above-described embodiments may be appropriately integrated or separated according to an implementation form or processing efficiency. In addition, for example, some or all of the embodiments and the modifications described above may be combined as long as there is no contradiction.

REFERENCE SIGN LIST

1: power conversion device
2: aerial wiring
3: rail
4: axle
101: inverter device
102: DC power supply
103: rotary machine
104: inverter circuit
105, 105b: control device
106: phase current detection circuit
108: inverter control unit
110: coil switching command unit
120: coil switching device
130: short-circuit portion
140: movable portion
141: inverter main circuit
142: gate driver
150: coil
151: neutral point
500: railway vehicle

The invention claimed is:

1. A rotary machine driving system comprising:
a rotary machine including a plurality of coils;
an inverter device configured to operate the rotary machine at a variable speed, the inverter device including an inverter circuit configured to convert DC power from a DC power supply into AC power and a control device configured to control power conversion by the inverter circuit, and
a coil switching device configured to switch a connection of the plurality of coils according to a command from the control device, wherein
the control device commands the coil switching device to switch the connection of the coils when rotation of the rotary machine transitions between a low-speed rotation range and a high-speed rotation range due to acceleration and deceleration,
a starting end and a terminal end of at least two sets of coils per phase of the rotary machine are drawn out in a freely connectable state,
the coil switching device includes at least one movable portion driven by one actuator,
the movable portion includes a first short-circuit portion configured to short-circuit at least two starting ends, a second short-circuit portion configured to short-circuit at least two terminal ends, and a third short-circuit portion configured to short-circuit at least one of the starting ends and at least one of the terminal ends,
each of the first short-circuit portion, the second short-circuit portion, and the third short-circuit portion is formed of a rectangular parallelepiped conductor, a cylindrical column conductor, or a cylindrical tube conductor, and
wherein each phase includes n sets (n is an integer of 2 or more) of coils, starting ends U1, U2, . . . , Un of the n sets of coils, and terminal ends Un+1, Un+2, . . . , U2n of the n sets of coils being drawn out in the freely connectable state, and a distance between the starting end Un and the terminal end U2n is set so as to be larger than a distance between the starting end Un and the starting end U1 and a distance between the starting end Un and the terminal end Un+1.

2. The rotary machine driving system according to claim 1, wherein
the coil switching device includes at least one movable portion driven by one actuator,
the movable portion includes:
a first short-circuit portion configured to short-circuit the starting ends U1, U2, . . . , Un,
a second short-circuit portion configured to short-circuit the terminal ends Un+1, Un+2, . . . , U2n, and
(m+1)th short-circuit portions (m is all integers of 2 or more and n or less) configured to short-circuit starting ends Um and terminal ends Un+m−1.

3. The rotary machine driving system according to claim 1, wherein each phase includes two sets of coils,
starting ends U1, U2 of the two sets of coils, and terminal ends U3, U4 of the two sets of coils are drawn out in the freely connectable state,
the coil switching device includes at least one movable portion driven by one actuator,
the movable portion includes:
a first short-circuit portion configured to short-circuit the starting ends U1, U2, and
a second short-circuit portion configured to short-circuit the terminal ends U3, U4, one of the first short-circuit portion and the second short-circuit portion also serves as a short-circuit portion configured to short-circuit the starting end U2 and the terminal end U3, and a distance between the starting end U2 and the terminal end U4 is set so as to be larger than a distance between the starting end U2 and the starting end U1 and a distance between the starting end U2 and the terminal end U3.

4. The rotary machine driving system according to claim 1, wherein each phase includes n sets (n is an even number of 4 or more) of coils, starting ends U1, U2, ..., Un of each of the n sets of coils, and terminal ends Un+1, Un+2, ..., U2n of the n sets of coils being drawn out in the freely connectable state, the coil switching device includes at least one movable portion driven by one actuator, the movable portion includes:

a first short-circuit portion configured to short-circuit the starting ends U1, U2, ..., Un, a second short-circuit portion configured to short-circuit the terminal ends Un+1, Un+2, ..., U2n, a third short-circuit portion configured to short-circuit starting ends Uk+1, Uk+2, ..., Un and terminal ends Un+1, Un+2, ..., U2n−k (k=n/2), (m+2)th short-circuit portions (m is all integers of 2 or more and k or less) configured to short-circuit starting ends Um and terminal ends Un+k+m−1, and (j+2)th short-circuit portion (j is all integers of k+1 or more and n or less) configured to short-circuit starting ends Uj and terminal ends Uk+j, and a distance between the starting end Un and the terminal end U2n is set so as to be larger than a distance between the starting end Un and the starting end U1 and a distance between the starting end Un and the terminal end Un+1.

5. The rotary machine driving system according to claim 1, wherein starting ends U1, V1, W1 of coils of respective phases and terminal ends U3, V3, W3 of coils of respective phases are drawn out in the freely connectable state, the coil switching device includes at least one movable portion driven by one actuator, the movable portion includes:

a first short-circuit portion configured to short-circuit the terminal ends U3, V3, W3, a second short-circuit portion configured to short-circuit the starting end U1 and the terminal end W3, a third short-circuit portion configured to short-circuit the starting end V1 and the terminal end U3, and a fourth short-circuit portion configured to short-circuit the starting end W1 and the terminal end V3, and a distance between the starting end W1 and the terminal end W3 is set so as to be larger than a distance between the starting end W1 and the starting end U1 and a distance between the starting end W1 and the terminal end U3.

6. The rotary machine driving system according to claim 1, the rotary machine driving system having a configuration of 1C1M in which one inverter device and one rotary machine are driven in combination.

7. The rotary machine driving system according to claim 1, the rotary machine driving system having a configuration of 1CiM (i=2, 3, 4, ... ) in which one inverter device and at least two rotary machines are driven in combination.

8. The rotary machine driving system according to claim 6, comprising:

at least two groups of the combination of the inverter device and the rotary machine.

9. A vehicle comprising the rotary machine driving system according to claim 1.

* * * * *